US011398951B2

(12) United States Patent
Rusev et al.

(10) Patent No.: US 11,398,951 B2
(45) Date of Patent: Jul. 26, 2022

(54) AUTOMATIC GENERATION OF CONFIGURATIONS FOR IOT ENDPOINTS

(71) Applicant: VMware, Inc., Palo Alto, CA (US)

(72) Inventors: Sabo Rusev, Sofia (BG); Stanislav Asenov Hadjiiski, Sofia (BG); Dobromir Ivanov, Sofia (BG); Sonya Ivanova Tsolova, Sofia (BG); Nikola Atanasov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/252,922

(22) Filed: Jan. 21, 2019

(65) Prior Publication Data
US 2020/0235994 A1 Jul. 23, 2020

(51) Int. Cl.
*H04L 41/08* (2022.01)
*H04L 41/0806* (2022.01)
*H04L 67/12* (2022.01)

(52) U.S. Cl.
CPC ...... *H04L 41/0886* (2013.01); *H04L 41/0806* (2013.01); *H04L 67/12* (2013.01)

(58) Field of Classification Search
CPC .. H04L 41/0886; H04L 41/0806; H04L 67/12
See application file for complete search history.

(56) References Cited

U.S. PATENT DOCUMENTS

| 10,291,477 | B1 * | 5/2019 | Askar | H04W 4/50 |
|---|---|---|---|---|
| 2014/0241354 | A1 * | 8/2014 | Shuman | H04L 12/281 370/390 |
| 2016/0344841 | A1 * | 11/2016 | Wang | H04L 67/12 |
| 2017/0126577 | A1 * | 5/2017 | Sender | H04L 47/70 |
| 2017/0155703 | A1 * | 6/2017 | Hao | H04L 67/12 |
| 2017/0242674 | A1 * | 8/2017 | Hussein | G06F 8/61 |
| 2017/0345420 | A1 * | 11/2017 | Barnett, Jr. | G06F 3/167 |
| 2018/0205793 | A1 * | 7/2018 | Loeb | G06T 19/003 |
| 2018/0270295 | A1 * | 9/2018 | Seed | G06F 9/52 |
| 2019/0020718 | A1 * | 1/2019 | Mathews | H04L 67/125 |
| 2019/0158355 | A1 * | 5/2019 | Ramisetty | H04L 41/0806 |
| 2019/0190737 | A1 * | 6/2019 | Kim | G06F 16/901 |
| 2019/0200405 | A1 * | 6/2019 | Gupta | H04W 4/70 |
| 2020/0028879 | A1 * | 1/2020 | Lahiri | G06Q 10/0635 |

* cited by examiner

*Primary Examiner* — William G Trost, IV
*Assistant Examiner* — Adam A Cooney
(74) *Attorney, Agent, or Firm* — Thomas Horstemeyer, LLP

(57) ABSTRACT

Disclosed are various embodiments for the automatic generation of configurations for Internet of Things (IoT) endpoints. At least one metric is collected for an Internet of Things (IoT) endpoint. Then, a function that generates configuration data for the IoT endpoint is invoked. In some instances, the at least one metric is supplied as an argument for the IoT endpoint. The configuration data is received as a result of the function. A device campaign is then created to apply the configuration data to the IoT endpoint. The IoT endpoint can then be assigned to the device campaign.

20 Claims, 4 Drawing Sheets

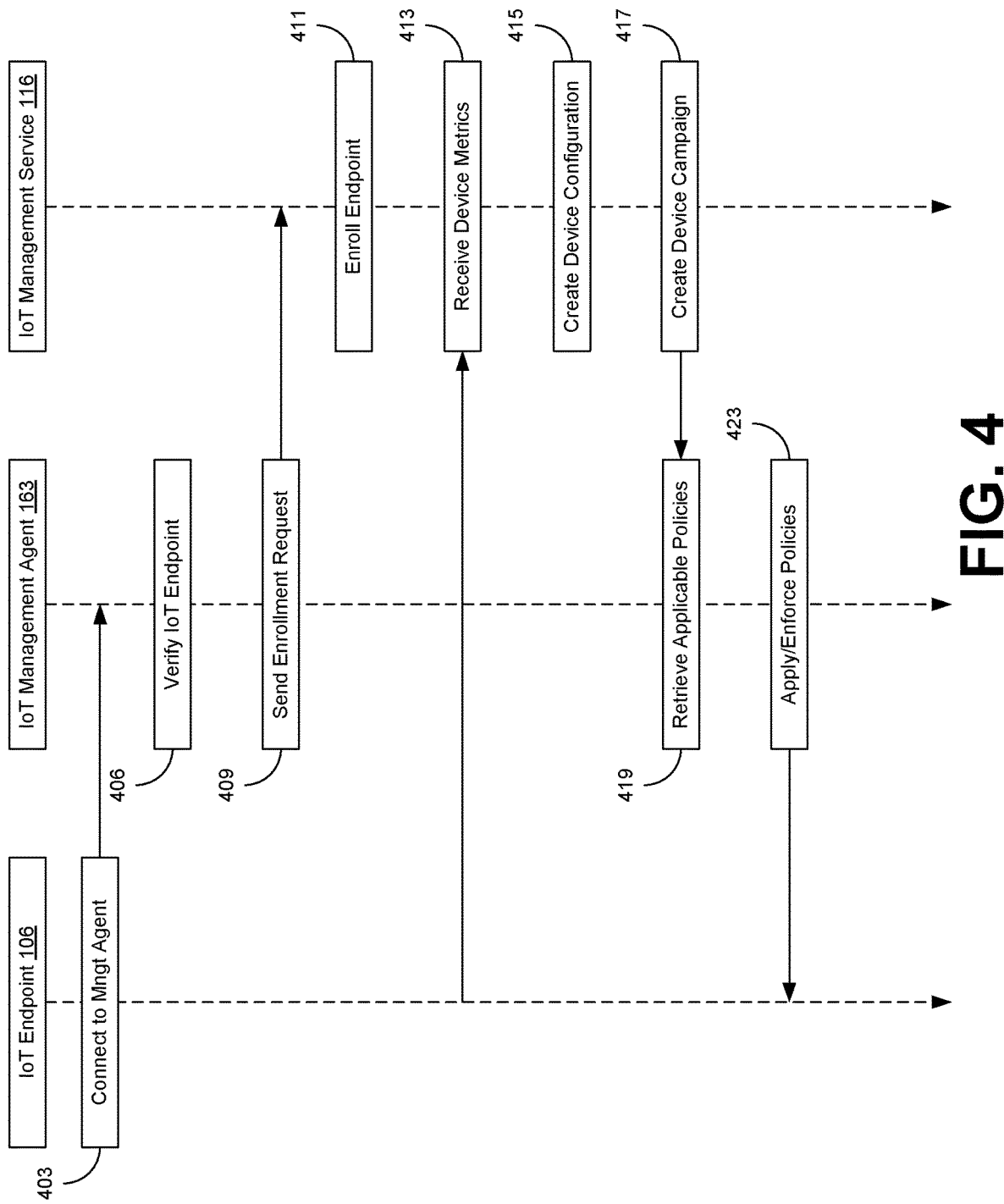

AUTOMATIC GENERATION OF CONFIGURATIONS FOR IOT ENDPOINTS

BACKGROUND

As the costs for electronic components have decreased, network and computational capabilities have been added to a wide range of devices that were typically operated independently. For example, appliances have network connectivity and computing components, allowing household appliances such as a refrigerator to reorder food from the grocery store for delivery or for a washing machine or a dryer to send an alert to a smartphone indicating that the appliance is finished. Automobiles have network connectivity, allowing individual components of the automobile to connect to the Internet, such as, allowing the radio to stream music from the Internet. Even thermostats and sprinkler controllers have network connectivity, allowing adjustment of settings based on weather reports downloaded from the Internet or remote adjustment of settings using a smartphone or computing device. The ever expanding number of devices which incorporate network connectivity and computational ability is often referred to as the "Internet of Things."

However, the scale of the Internet of Things presents a number of management issues. For example, where an enterprise can have had a few hundred computers that could be manually administered by an information technology (IT) department, the number of devices in the Internet of Things can result in tens of thousands of network connected devices being deployed in an enterprise environment. Management of these devices, such as requirements to deploy security patches or update configuration settings, at such scale strains the resources of not just IT departments, but also of many automated solutions employed by enterprises for managing network connected devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 is a sequence diagram depicting an example interaction between various components of the network environment of FIG. 1

DETAILED DESCRIPTION

Disclosed are various approaches for automating the configuration of client devices. Client devices may be configured in numerous ways. Moreover, an optimal configuration for a client device may be dependent on the environment in which the client device is deployed or the purpose for which the client device is deployed. As an illustrative example, a programmable or remotely controlled heating, ventilation, and air-conditioning (HVAC) system may have an optimal configuration when installed in a residential setting, such as a house, but another optimal configuration when installed in a commercial setting, such as an office. Likewise, programmable sprinkler controllers might have different optimal configurations when installed for different yards, which may have different respective amounts of vegetation, soil composition, slope, and shade. Other client devices may likewise have different preferred or optimized configuration options based on the manner in which they are installed, the operating environment in which they are installed, and similar factors. However, given the number of potential differences in operating conditions, and the number of settings and potential values of settings for client devices, it is often not evident to an end user what the optimal or preferred configuration for a client device would be. Accordingly, various embodiments of the present disclosure allow for the automated configuration of managed client devices in order to configure the devices in an optimal manner for their operating environment.

Figure 1:
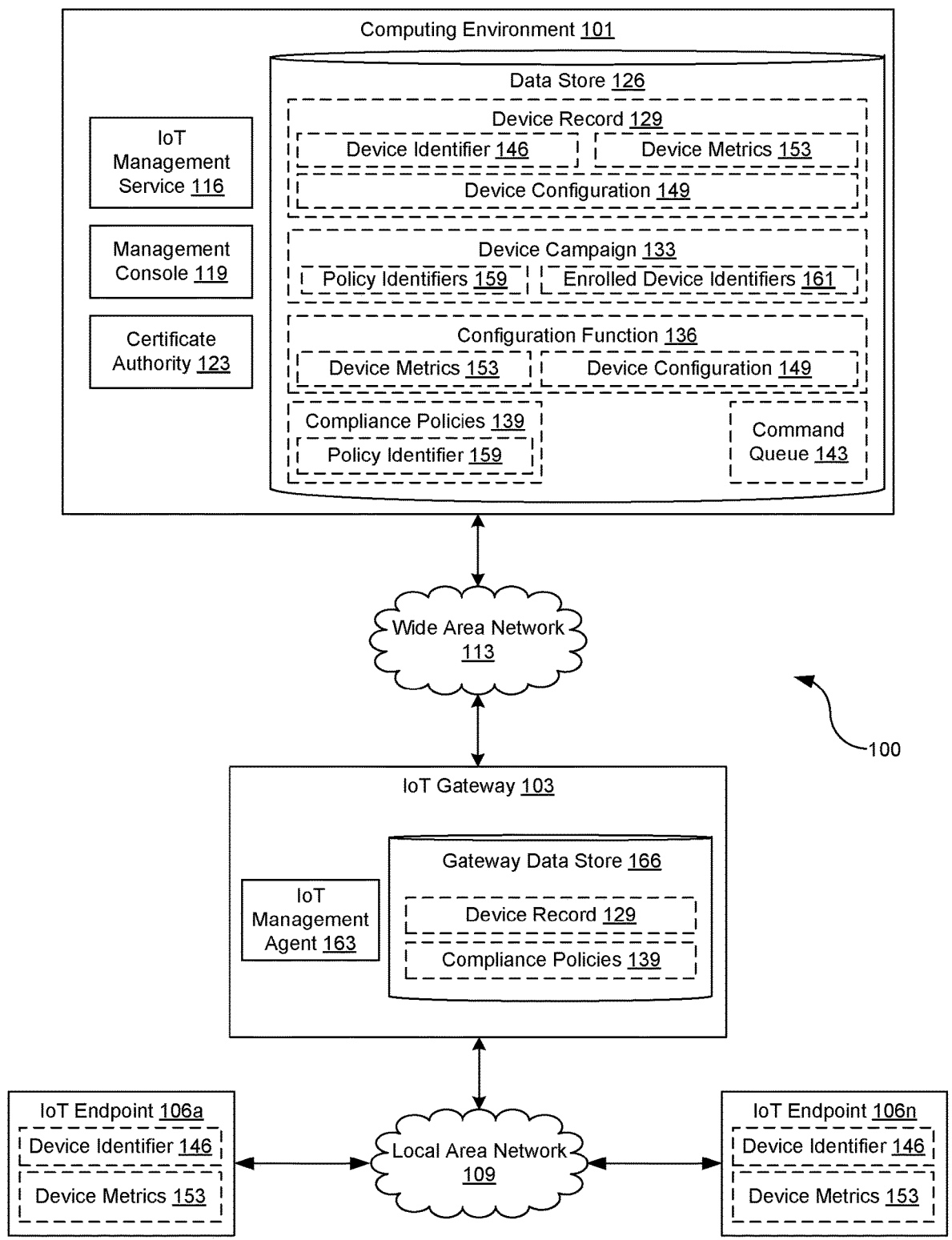
FIG. 1 is a drawing illustrating an example arrangement of a network environment according to various embodiments of the present disclosure.

As illustrated in FIG. 1, shown is a network environment 100 according to various embodiments. The network environment 100 includes a computing environment 101, an internet of things (IoT) gateway 103, and a number of IoT endpoints 106a-n. The computing environment 101, the IoT gateway 103, and the IoT endpoints 106a-n can be in data communication with each other. For example, multiple IoT endpoints 106a-n can be in data communication with each other or with an IoT gateway 103 over a local area network (LAN) 109. The IoT gateway 103 can in turn be in data communication with the computing environment 101 over a wide area network (WAN) 113.

The LAN 109 represents a computer network that interconnects computers within a limited area or a limited logical grouping. For example, the LAN 109 could include a wired or wireless network that connects computing devices within a building (such as a residence, office, school, laboratory, or similar building), collection of buildings (such as, a campus, an office or industrial park, or similar locale etc.), a vehicle (such as an automobile, an airplane, train, a boat or ship, or other vehicle), an organization (such as devices with network connectivity owned or leased by an organization), or other limited area or limited grouping of devices.

The WAN 113 represents a computer network that interconnects computers that are members of separate LANS 109. Accordingly, the WAN 113 can correspond to a network of networks, such as the Internet.

The LAN 109 and the WAN 113 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless WI-FI® networks, BLUETOOTH® networks, microwave transmission networks, as well as other networks relying on radio broadcasts. The LAN 109 or the WAN 113 can also include a combination of two or more networks.

The computing environment 101 can include, for example, a server computer or any other system providing computing capability. Alternatively, the computing environment 101 can employ a plurality of computing devices that can be arranged, for example, in one or more server banks, computer banks, or other arrangements. Such computing devices can be located in a single installation or can be distributed among many different geographical locations. For example, the computing environment 101 can include a plurality of computing devices that together can include a hosted computing resource, a grid computing resource or any other distributed computing arrangement. In some cases, the computing environment 101 can correspond to an elastic computing resource where the allotted capacity of processing, network, storage, or other computing-related resources can vary over time.

Various applications or other functionality can be executed in the computing environment 101 according to various embodiments. The components executed on the computing environment 101, for example, can include an IoT management service 116, a management console 119, a certificate authority 123, and other applications, services, processes, systems, engines, or functionality not discussed in detail herein.

Also, various data is stored in a data store 126 that is accessible to the computing environment 101. The data store 126 can be representative of a plurality of data stores 126, which can include relational databases, object-oriented databases, hierarchical databases, hash tables or similar key-value data stores, as well as other data storage applications or data structures. The data stored in the data store 126 is associated with the operation of the various applications or functional entities described below. This data can include one or more device records 129, one or more device campaigns 133, one or more configuration functions 136, one or more compliance policies 139, one or more command queues 143, and potentially other data.

The IoT management service 116 can oversee the operation of IoT gateways 103 and IoT endpoints 106 enrolled with the IoT management service 116. The IoT management service 116 can further cause device records 129 to be created, modified, or deleted (such as in response to enrollment or unenrollment or registration of an IoT endpoint 106). Commands issued by the IoT management service 116 for IoT endpoints 106 or IoT gateways 103, such as to apply settings or perform actions specified by compliance policies 139, can be stored in the command queue 143 by the IoT management service 116. As discussed later, the IoT gateway 103 can retrieve and execute any commands stored in the command queue 143.

The management console 119 can provide an administrative interface for configuring the operation of individual components in the network environment 100. For example, the management console 119 can provide an administrative interface for the IoT management service 116, and/or the certificate authority 123. The management console 119 can also provide an interface for the configuration of compliance policies 139 applicable to IoT endpoints 106. Accordingly, the management console 119 can correspond to a web page or a web application provided by a web server hosted in the computing environment 101.

The certificate authority 123 can issue and validate cryptographic certificates. For example, the certificate authority 123 can issue cryptographic certificates to services or devices in response to a request for a certificate. The certificate authority 123 can also validate the authenticity of certificates that have been issued by the certificate authority 123. For example, an application executing on the IoT gateway 103 or the IoT endpoint 106 can request that the certificate authority 123 validate a certificate issued to a service or server with which the IoT gateway 103 or IoT endpoint 106 is interacting.

A device record 129 can represent an IoT endpoint 106 enrolled with and managed by the IoT management service 116. Accordingly, a device record 129 can be created by the IoT management service 116 in response to enrollment of a respective IoT Endpoint 106. Therefore, each device record 129 can include a device identifier 146, a device configuration 149, one or more device metrics 153, and potentially other data.

A device identifier 146 can represent data that uniquely identifies an IoT endpoint 106 with respect to another IoT endpoint 106 and, therefore, allow one to uniquely identify one device record 129 with respect to another device record 129. Examples of device identifiers 146 include media access control (MAC) addresses of network interfaces of individual IoT endpoints 106, globally unique identifiers (GUIDs) or universally unique identifiers (UUIDs) assigned to enrolled IoT endpoints 106, international mobile equipment identifier (IMEI) numbers assigned to cellular modems of IoT endpoints 106, and tuples that uniquely identify an IoT endpoint 106 (such as a combination of a manufacturer name and serial number). However, other information can also be used as a device identifier 146 in various implementations.

A device configuration 149 can represent data provided to an IoT endpoint 106 in order to configure the IoT endpoint 106. A device configuration 149 can be provided in several forms. For example, a device configuration 149 could represent a configuration file, such as an extensible markup language (XML) file or a comma or tabbed separated value (CSV or TSV) text file, that specifies particular settings and the values for those settings. As another example, a device configuration 149 could represent a binary file with preconfigured settings, such as a device firmware file with various settings preset to respective values. In some implementations, the device configuration 149 can also represent a script that, when executed, invokes functions provided by an application programming interface (API) of an IoT endpoint 106 to specify values for individual settings of the IoT endpoint 106. However, device configurations 149 can also be stored, implemented, or provided for by any type of appropriate data structure.

A device metric 153 can represent information related to or regarding an IoT endpoint 106, such as the status of an IoT endpoint 106 or a component of an IoT endpoint 106 at various points in time. Device metrics 153 can include any reading from a sensor installed on the IoT endpoint 106, any record or log of any activity or operation performed by the IoT endpoint 106, or other data collected or generated by the IoT endpoint 106. Examples of device metrics 153 include resource usage metrics (e.g., memory, processor, and network bandwidth usage), application execution metrics (e.g., which applications were executing, when the applications started or ceased execution, the arguments to or output from an application, etc.), user input metrics (e.g., when a user input was submitted and what the user input was), location data (e.g., device location obtained using geolocation circuits), sensor readings (e.g., temperature readings, sound recordings, volume level readings, pressure sensor readings), as well as other metrics appropriate for individual IoT endpoints 106.

Device metrics 153 may be recorded or stored at periodic intervals. For example, an IoT endpoint 106 may report one or more device metrics 153 each second, each minute, every fifteen minutes, every hour, etc. To conserve bandwidth and minimize processing overhead, device metrics 153 may be reported by the IoT endpoint 106 and stored in the data store 126 in batches. For example, every fifteen minutes or every hour, the IoT endpoint 106 may provide to the IoT management service 116 the device metrics 153 collected or generated in the previous fifteen minutes, hour, or other interval of time.

A device campaign 133 can represent a set or collection of compliance policies 139 that have been assigned to one or more IoT endpoints 106. When an IoT endpoint 106 is assigned to a device campaign 133, the IoT management service 116 can cause any compliance policies 139 identified by or associated with the device campaign 133 to be enforced on the IoT endpoint 106, as later described. Accordingly, the device campaign 133 can include one or more policy identifiers 159 that identify individual compliance policies 139 assigned to or associated with the device campaign 133, a list of enrolled device identifiers 161 that includes device identifiers 146 identifying device records 129 for IoT endpoints 106 subject to the device campaign 133, and potentially other information.

A configuration function 136 can represent an executable function that, when invoked by the IoT management service 116, generates a device configuration 149. The configuration function 136 may be provided with one or more device metrics 153 as arguments to be analyzed for generating the device configuration 149. For example, if the IoT endpoint 106 were a programmable or adjustable thermostat, the configuration function 136 might accept as arguments temperature readings for the previous week, month, or other period of time, and the temperatures at which the thermostat was set for the previous week, month, or other period of time. The configuration function 136 could then analyze these device metrics 153 to determine appropriate or optimal settings for the IoT endpoint 106. The configuration function 136 could then generate a respective device configuration 149 containing the appropriate or optimal settings for the IoT endpoint 106.

The configuration function 136 can be created or provided by any entity. Accordingly, the configuration function 136 may be viewed as a "function-as-a-service" (FaaS) that can be created by any entity and hosted or provided by the IoT management service 116. For example, a manufacturer of an IoT endpoint 106 could create a respective configuration function 136 for each device it manufactures. Accordingly, an administrative user could retrieve the configuration function 136 from the manufacturer and upload it using the management console 119 in response to one or more of the manufacturer's IoT endpoints 106 registering or being registered with the IoT management service 116. Likewise, end users or enterprises could create their own configuration functions 136 for devices that they control.

A compliance policy 139 represents a definition of a state in which an IoT endpoint 106 is required to be. For example, a compliance policy 139 may specify that a particular version of a device configuration 149 generated by the configuration function 136 be installed on a respective IoT endpoint 106. Similarly, a compliance policy 139 may specify that the most recently created device configuration 149 generated by the configuration function 136 be installed on the IoT endpoint 106. A compliance policy 139 can also include a policy identifier 159 that uniquely identifies a compliance policy 139 with respect to other compliance policies 139. Examples of policy identifiers 159 can include an incremented integer or similar value, a GUID, a UUID, or similar unique identifier.

In some instances, the compliance policy 139 can also include or specify a remedial action to be taken if the specified state or configuration is violated. Using the example of a thermostat as an IoT endpoint 106, if the compliance policy 139 specifies a particular temperature, the compliance policy 139 may also specify that if the thermostat is manually adjusted, then the temperature for the thermostat should be reset to the temperature specified by the compliance policy 139. Using another example of an electronic lock as an IoT endpoint 106, a compliance policy 139 may specify that the electronic lock should only allow users to access a secure room during business hours using a secret key number. However, the compliance policy 139 may specify that attempts to unlock the electronic lock outside of business hours may be permitted (e.g., for emergency access purposes), but that unlocking the lock outside of business hours triggers the remedial action of alerting the appropriate security personnel.

A command queue 143 can represent a queue of commands sent from an IoT management service 116 to an IoT management agent 163. When the IoT management service 116 sends a command or instruction, such as a command to apply a compliance policy 139 specified in a device campaign 133 to an IoT endpoint 106, the command can be stored in the command queue 143 until the IoT management agent 163 retrieves the command from the command queue 143. In some instances, a dedicated command queue 143 can be created for each instance of an IoT management agent 163. In other instances, however, a single command queue 143 can be used to store commands intended for multiple IoT management agents 163.

The IoT gateway 103 represents a computing device that acts as a proxy or relay between IoT endpoints 106a-n and the IoT Management service 116. For example, an IoT gateway 103 can represent a network access point or interface between the local area network 109 and the wide area network 113. In other instances, the IoT gateway 103 can be a dedicated device attached to the LAN 109 that communicates across the WAN 113 with the IoT management service 116 on behalf of IoT endpoints 106 attached to the LAN 109.

An IoT management agent 163 can be executed by the IoT gateway 103 to perform various functions on behalf of the IoT endpoints 106a-n. For example, the IoT management agent 163 can register or enroll IoT endpoints 106a-n with the IoT management service 116. As another example, the IoT management agent 163 can download, process, and enforce one or more applicable compliance policies 139. For instance, the IoT management agent 163 can retrieve a command from the command queue 143. The command can instruct the IoT management agent 163 to install an updated device configuration 149 on several IoT endpoints 106. Accordingly, the IoT management agent 163 could then download the specified version of the specified device configuration 149 and relay it to the respective IoT endpoints 106 for installation.

The gateway data store 166 can be representative of a plurality of gateway data stores 166, which can include relational databases, object-oriented databases, hierarchical databases, hash tables or similar key-value data stores, as well as other data storage applications or data structures. The data stored in the gateway data store 166 is associated with the operation of the various applications or functional entities described below. This data can include one or more device records 129 of respective IoT endpoints 106a-n, any applicable compliance policies 139, and potentially other information as appropriate for an implementation.

An IoT endpoint 106 is representative of any internet connected embedded device, appliance, sensor, or similar smart device. Examples of IoT endpoints 106 can include network connected home appliances (such as locks, refrigerators, thermostats, sprinkler controllers, smoke detectors, garage door openers, light-switches, fans, lights, security cameras, or similar devices), vehicular electronics (such as on-board diagnostic computers, entertainment systems, access controls, or similar devices), and other similar network connected devices. IoT endpoints 106 are often distinguishable from other client devices (such as personal computers or mobile devices) by their lack of functionality. For example, IoT endpoints 106 often do not provide general purpose computing abilities, lack an operating system that allows for a remote management service to gain direct administrative control over the IoT endpoint 106, and/or IoT endpoints 106 are not configured or configurable to execute an IoT management agent 163.

Often, an IoT endpoint 106 can also store a device identifier 146 that uniquely identifies the IoT endpoint 106 and one or more device metrics 153. The device metrics 153 may be collected or generated by the IoT endpoint 106 at regular intervals (e.g., every second, every thirty seconds, every minute, every hour, every day, etc.). For example, one or more sensors installed on the IoT endpoint 106 may record and store sensor readings at periodic intervals. Likewise, the IoT endpoint 106 may record or otherwise log at periodic or regular intervals events that have occurred, such as a change in state, initiation or completion of a task or operation, data or commands submitted by a user, etc.

Next, a general description of the operation of the various components of the networked environment 100 is provided. However, more detailed descriptions of the operation of individual components of the networked environment 100 is set forth in the discussion of the subsequent figures.

To begin, an IoT endpoint 106 can enroll itself with the IoT management service 116. Accordingly, the IoT endpoint 106 can send a registration or enrollment request to the IoT management agent 163 executing on the IoT gateway 103. The enrollment request can include the device identifier 146 for the IoT endpoint 106. In some instances, the enrollment request can also include one or more device metrics 153. However, in other instances, the device metrics 153 can be provided later. In some implementations, the IoT endpoint 106 can sign the enrollment request using a certificate installed by the manufacturer of the IoT endpoint 106. However, the enrollment request can also include other authentication credentials in various implementations.

The IoT management agent 163 then verifies or authenticates the IoT endpoint 106. For example, the IoT management agent 163 can send a request to the certificate authority 123 to verify the certificate used to generate the signature of the enrollment request provided by the IoT endpoint 106.

After verifying the IoT endpoint 106, the IoT management agent 163 enrolls the IoT endpoint 106 with the IoT management service 116. For example, the IoT management agent 163 can relay the enrollment request from the IoT endpoint 106. As another example, the IoT management agent 163 can generate its own enrollment request that contains the device identifier 146. In some instances, the IoT management agent's 146 enrollment request can also include the device metrics 153 of the IoT endpoint 106, if they were provided by the IoT endpoint 106.

In response to receipt of the enrollment request from the IoT management agent 163, the IoT management service 116 can perform several operations. First, the IoT management service 116 can verify the enrollment request. For example, the IoT management service 116 can verify with the certificate authority 123 the certificate used by the IoT management agent 163 or the IoT endpoint 106, as appropriate, to sign the enrollment request is a valid certificate.

If the certificate and signatures are valid, then the IoT management service 116 can proceed to enroll the IoT endpoint 106. For example, the IoT management service 116 can create a device record 129 for the IoT endpoint 106 that includes the device identifier 146 of the IoT endpoint 106. If the device metrics 153 for the IoT endpoint 106 were included in the enrollment request, then the IoT management service 116 can include the device metrics 153 in the device record 129 as well.

Otherwise, the IoT management service 116 can send a request to the IoT management agent 163 for the device metrics 153 of the IoT endpoint 106 being registered. For example, the IoT management service 116 can place a command in a command queue 143 associated with the IoT management agent 163. When the IoT management agent 163 checks the command queue 143, it can retrieve the command requesting the device metrics 153 of the IoT endpoint 106 and provide them in response. Upon receipt of the device metrics 153 of the IoT endpoint 106 from the IoT management agent 163, the IoT management service 116 can add the device metrics 153 to the device record 129 created for the IoT endpoint 106. At this point, the IoT endpoint 106 can be considered to be enrolled with the IoT management service 116.

Subsequent to enrollment of an IoT endpoint 106, the IoT management service 116 can begin to collect and store data related to one or more device metrics 153 associated with the IoT endpoint 106. These device metrics 153 may be reported by the IoT endpoint 106. For example, the IoT endpoint 106 may send the device metrics 153 to an IoT management agent 163 executed by an IoT gateway 103, which in turn relays the device metrics 153 to the IoT management service 116. Upon receipt, the IoT management service 116 can store the device metrics 153 receives from the IoT management agent 163 in respective device records 129 for individual IoT endpoints 106. As previously discussed, the IoT endpoint 106 may provide device metrics 153 on a continuous basis or in batches. Likewise, the IoT management agent 163 may relay device metrics 153 to the IoT management service 116 on a continuous basis or in batches.

Subsequently, the IoT management service 16 may execute or otherwise invoke a configuration function 136 for a respective IoT endpoint 106. In some instances, the configuration function 136 may be invoked in response to an event. For example, the configuration function 136 may be invoked in response to a command submitted by an administrative user through the management console 119. As another example, the configuration function 136 may be invoked in response to enrollment or registration of the IoT endpoint 106. In other instances, the configuration function 136 may be invoked at periodic intervals in order to generate new or updated device configurations 149 that take the most recently collected device metrics 153 into account.

In response to invocation, the configuration function 136 is executed by the IoT management service 116 and generates a device configuration 149 for a respective IoT endpoint 106. In some instances, one or more device metrics 153 may be supplied as arguments to the configuration function 136. In other instances, a device identifier 146 for a device record 129 is supplied to the configuration function 136, which then executes a subroutine or function call to retrieve the device metrics 153 stored in the device record 129 for the IoT endpoint 106. Then, the configuration function 136 performs an analysis of the device metrics 153 and generates an optimal device configuration 149 according to one or more rules encoded in or referenced by the configuration function 136. The device configuration 149 is then returned by the configuration function 136 to the IoT management service 116 as a result or output, which is stored in turn in the device record 129.

The newly generated device configuration 149 can then be provided to the respective IoT endpoint in a number of ways.

For example, an IoT Endpoint 106 may already be subject to a compliance policy 139 specifying that the IoT endpoint use the most recently generated device configuration 149. Therefore, the IoT management service 116 may insert a command into the command queue 143 that notifies the IoT endpoint 106 that a new device configuration 149 is available, thereby causing the IoT management agent 163 executing on the IoT gateway 103 for the IoT endpoint 106 to download and install the new device configuration 149 on the IoT endpoint 106. As another example, the IoT management service 116 can create a new compliance policy 139. The new compliance policy 139 can specify that the IoT endpoint 106 use the newly generated device configuration 149. A command can then be inserted into the command queue 143 identifying the compliance policy 139 to be applied to the IoT endpoint 106. Once the new policy 139 is retrieved by the IoT management agent 163, the IoT management agent 163 can then retrieve and install or apply the new device configuration 149 to the respective IoT endpoint 106.

After applying any compliance policies 139 or otherwise installing a device configuration 149, the IoT management agent 163 can send a response to the IoT management service 116 indicating that the compliance policies 139 were successfully applied of the device configuration 149 was successfully installed. The IoT management service 116 could then update a device record 129 for the IoT endpoint 106 to indicate that the device campaign 133 has been successfully applied to the IoT endpoint 106.

Figure 2:
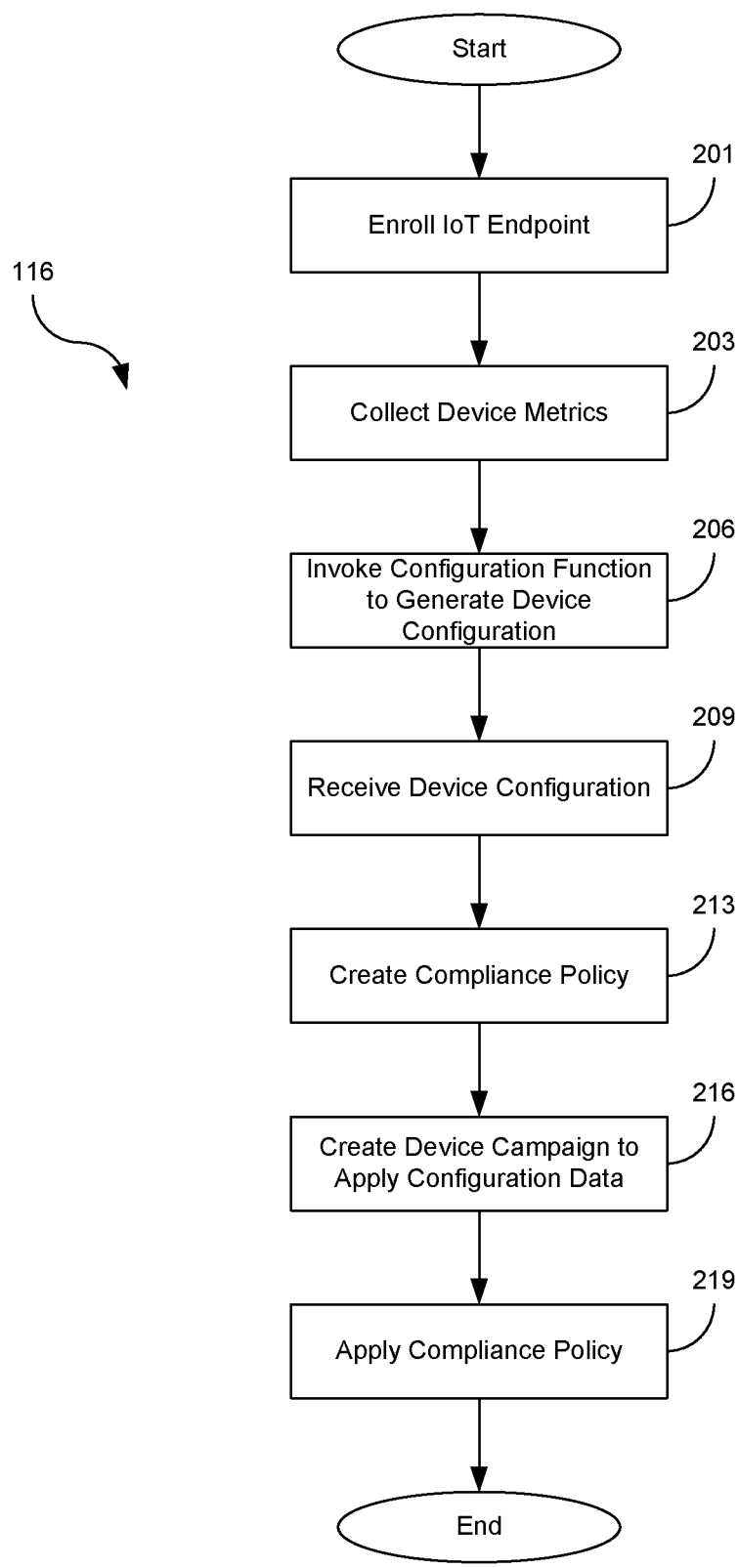
FIGS. 2 and 3 are flowcharts depicting examples of the operation of components of the network environment of FIG. 1.

Referring next to FIG. 2, shown is a flowchart that provides one example of the operation of the IoT management service 116. It is understood that the flowchart of FIG. 2 provides merely an example of the many different types of functional arrangements that can be employed to implement the operation of the IoT management service 116. As an alternative, the flowchart of FIG. 2 can be viewed as depicting an example of elements of a method implemented in the computing environment 101.

Beginning at step 201, the IoT management service 116 enrolls or registers an IoT endpoint 106 in response to an enrollment or registration request received from the IoT management agent 163. For example, the IoT management service 116 can create a device record 129 for the IoT endpoint 106 that includes the device identifier 146 of the IoT endpoint 106. At this point, the IoT endpoint 106 can be considered to be enrolled with the IoT management service 116.

In some implementations, the IoT management service 116 can also verify the enrollment request for the IoT endpoint 106 that was received from the IoT management agent 163. For example, the IoT management service 116 can verify with the certificate authority 123 that the certificate used by the IoT management agent 163 or the IoT endpoint 106, as appropriate, to sign the enrollment request is a valid certificate. If the certificate and signatures are valid, then the IoT management service 116 can proceed to enroll the IoT endpoint 106.

Next at step 203, the IoT management service 116 begins to collect device metrics 153 for the newly enrolled IoT endpoint 106. If the device metrics 153 for the IoT endpoint 106 are automatically provided by the IoT endpoint 106, then the IoT management service 116 can include the device metrics 153 in the device record 129 as they are received. Otherwise, the IoT management service 116 can send a request to the IoT management agent 163 for the device metrics 153 of the IoT endpoint 106 that was registered. For example, the IoT management service 116 can place a command in a command queue 143 associated with the IoT management agent 163 that instructs the IoT management agent 163 to provide the device metrics 153 for the IoT endpoint 106. Upon receipt of the device metrics 153 of the IoT endpoint 106 from the IoT management agent 163, the IoT management service 116 can add the device metrics 153 to the device record 129 created for the IoT endpoint 106. As previously discussed, device metrics may be reported or requested on a continuous or a periodic basis.

Then at step 206, the IoT management service 116 can invoke a configuration function 136 to generate a device configuration 149. The configuration function 136 may accept one or more device metrics 153 as arguments. However, in some implementations, the device identifier 146 of a device record 129 may be provided to the configuration function 136. In response, the configuration function 136 can then retrieve the device metrics 153 stored in the device record 129. The device metrics 153 are analyzed and processed by the configuration function 136 to generate an optimal or preferred device configuration 149 for the IoT endpoint 106.

As an example, an office building may have an HVAC system with multiple IoT endpoints 106 (e.g., thermostats, thermometers, humidity sensors, chemical sensors, motion sensors, etc.). This may include carbon dioxide ($CO_2$) sensors placed throughout the office building. When high levels of $CO_2$ are detected, this could indicate that the office building is occupied. Similarly, increases in temperature detected by a thermostat or thermometer could also indicate that the office building is occupied due to the body heat emitted by individuals in the building. Likewise, motion sensors could detect activity in the building. Each of these IoT endpoints 106 could generate device metrics 153 that are stored. The configuration function 136 for the HVAC system could then use these device metrics 153 to generate device configurations 149 for individual thermostats or the HVAC system as a whole to optimize the power usage of the HVAC system based on whether or not the office building is currently occupied.

A similar, but simpler example, could involve a single IoT endpoint 106, such as a single thermostat for a room. The thermostat could record when people adjust the temperature of the thermostat, the new temperature the thermostat is set to, and the previous temperature of the room, as well as the date and time that the settings were changed. These device metrics 153 could be saved and used by a configuration function 136 to generate a device configuration 149 that automatically adjusts the temperature of the thermostat based on the date and the time of day.

In some instances, the type of device configuration 149 may also be indicated when the configuration function 136 is invoked. For example, an IoT endpoint 106 may use a different device configuration 149 to operate in the most power-efficient manner than the device configuration 149 used to operate in a highest-performing manner. If the IoT management service 116 provides an argument specifying the type of device configuration 149 to be generated, the configuration function 136 may further base the device configuration 149 on the type of device configuration identified when the configuration function 136 is invoked.

Proceeding to step 209, the IoT management service 116 can receive the device configuration 149 generated as a result or output of the configuration function 136. The device configuration 149 can then be stored in the device record 129 created for the IoT endpoint 106.

Next at step 213, the IoT management service 116 can create a compliance policy 139 to enforce the use of the newly generated device configuration 149. For example, the IoT management service 116 may create a new compliance policy 139 and specify in the compliance policy that the IoT endpoint 106 use the most recently generated device configuration 149. As another example, the IoT management service 116 can create a new compliance policy 139, or update an existing compliance policy 139, that specifies the version of the device configuration 149 to be used. The IoT management service 116 may also specify a remedial action for the compliance policy 139, such as a previously described remedial action. The remedial action may have been previously specified using the management console 119.

Then at step 216, the IoT management service 116 can create a device campaign 133 to enforce the use of the device configuration 149. To create the device campaign 133, the IoT management service 116 may add the policy identifier 159 for the compliance policy 139 created at step 213 to the list of policy identifiers 159 of compliance policies 139 assigned to the device campaign 133. In some instances, additional compliance policies 139 may also be assigned to the device campaign 133, and therefore additional policy identifiers 159 may also be included in a device campaign 133. However, in some instances, a device campaign 133 with a single policy identifier 159 may be created to enforce the use of the device configuration 149 generated at step 213.

Finally, at step 219, the IoT management service 116 can automatically assign or subscribe the IoT endpoint 106 to the device campaign 133. For example, the IoT management service 116 may add the device identifier 146 of the IoT endpoint 106 to the list of enrolled device identifiers 161 for the device campaign 133. As a result, the IoT endpoint 106 is enrolled in the device campaign 133, thereby allowing the compliance policy 139 for the device configuration 149 to be enforced.

In response to enrollment of the IoT endpoint 106 in the device campaign 133, the IoT management service 116 can cause the compliance policy 139 associated with the device campaign 133 to be applied to the IoT endpoint 106. To enforce a compliance policy 139 for a newly registered or enrolled IoT endpoint 106, the IoT management service 116 can retrieve the set of policy identifiers 159 specified by a device campaign 133 to which the IoT endpoint 106 has been assigned or subscribed. The IoT management service 116 can then create a command specifying the device identifier 146 of the IoT endpoint 106 and the policy identifiers 159 for each compliance policy 139 listed in the device campaign 133. The command can then be inserted into a command queue 143 associated with the IoT management agent 163 registered or enrolled with the IoT endpoint 106.

Figure 3:
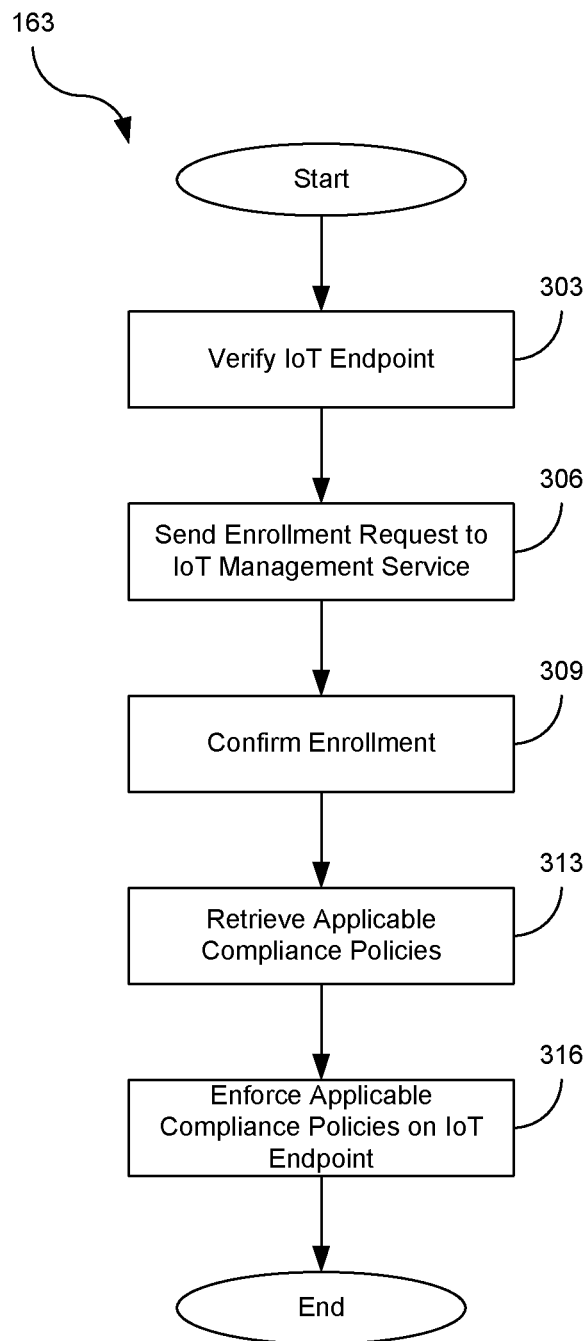

Referring next to FIG. 3, shown is a flowchart that provides one example of the operation of the IoT management agent 163. It is understood that the flowchart of FIG. 3 provides merely an example of the many different types of functional arrangements that can be employed to implement the operation of the IoT management agent 163. As an alternative, the flowchart of FIG. 3 can be viewed as depicting an example of elements of a method implemented in the computing environment 101.

Beginning at step 303, the IoT management agent 163 can verify the identity of an IoT endpoint 106 communicating through the LAN 109 with the IoT management agent 163. For example, the IoT management agent 163 can verify the identity of the IoT endpoint 106 in response to the IoT endpoint 106 joining or being connected to the LAN 109. Similarly, the IoT management agent 163 can verify the identity of the IoT endpoint 106 in response to a request from the IoT endpoint 106 to enroll with the IoT management service 116.

Verification can be performed using various approaches. For example, the IoT endpoint 106 can use a preinstalled certificate to authenticate itself with the IoT management agent 163. Accordingly, the IoT management agent 163 can communicate with the certificate authority 123 to determine the validity of the certificate. If the certificate is valid, then the IoT endpoint 106 can be considered to be authenticated.

Next at step 306, the IoT management agent 163 can send an enrollment request to the IoT management service 116 to enroll the IoT endpoint 106. In some instances, the enrollment request can have been initiated by the IoT endpoint 106. In these instances, the IoT management agent 163 can simply relay the request from the IoT endpoint 106 to the IoT management service 116. However, in other instances, the IoT endpoint 106 can be unaware of the IoT management service 116, not configured to communicate or interact with the IoT management service 116, or otherwise incapable of interacting with the IoT management service 116. For example, an IoT endpoint 106, such as a consumer device or simple IoT device, can not have any built-in functionality or awareness of the IoT management service 116. However, the IoT management agent 163 on the IoT gateway 103 can be able to interact with both the IoT endpoint 106 and the IoT management service 116. Accordingly, the IoT management agent 163 can enroll the IoT endpoint 106 with the IoT management service 116 and enforce any applicable compliance policies 139 applicable to the IoT endpoint 106 on behalf of the IoT management service 116.

Various information can be included in the enrollment request. Usually, the device identifier 146 for the IoT endpoint 106 being enrolled is included in the enrollment request. In some instances, additional device metrics 153 provided by the IoT endpoint 106 can be included in the enrollment request. In other instances, the IoT management service 116 will request relevant device metrics 153 as part of the enrollment process. In these instances, the IoT management agent 163 will provide the device metrics 153 for the IoT endpoint 106 being registered in response. For example, the IoT management agent 163 can retrieve a command from the command queue 143 that requests one or more device metrics 153 of the IoT endpoint 106. In response, the IoT management agent 163 can either provide device metrics 153 for the IoT endpoint 106 that are cached in the gateway data store 166 or the IoT management agent 163 can request the device properties from the IoT endpoint 106 and relay them to the IoT management service 116.

Then at step 309, the IoT management agent 163 can confirm enrollment with the IoT management service 116. For example, the IoT management agent 163 can receive a response from the IoT management service 116 that enrollment was successful.

Subsequently at step 313, the IoT management agent 163 can retrieve one or more applicable compliance policies 139 for the newly enrolled IoT endpoint 106. For example, the IoT management agent 163 can retrieve one or more commands from the command queue 143. One or more of these commands can specify a policy identifier 159 of a compliance policy 139 to be enforced on or applied to the newly enrolled IoT endpoint 106. In response, the IoT management agent 163 can retrieve the applicable compliance policies 139 identified by the policy identifiers 159 listed in the commands retrieved from the command queue 143.

Then, at step 316, the IoT management agent 163 can cause the applicable compliance policies 139 to be enforced for the newly enrolled IoT endpoint 106. As an example, if the compliance policy 139 specifies that a specific device configuration 149 or version of a device configuration 149 be installed on the IoT endpoint 106, the IoT management agent 163 can invoke a function provided by an application programming interface (API) of the IoT endpoint 106 to cause the IoT endpoint 106 to download and install the device configuration 149. An argument to the function could be the network address or path for the device configuration 149 to be installed. As another example, the IoT management agent 163 could retrieve the device configuration 149 and provide it to the IoT endpoint 106 (such as an argument to a function provided by an API) for installation. Once all of the compliance policies 139 have been enforced or applied to the IoT endpoint 106, the process can end.

FIG. 4 is a sequence diagram depicting the interaction between various components of the network environment 100. It is understood that the sequence diagram of FIG. 4 provides merely an example of the many different types of functional arrangements that can be employed to implement the operation of the network environment 100. As an alternative, the sequence diagram of FIG. 4 can be viewed as depicting an example of elements of a method implemented in the network environment 100.

Beginning at step 403, the IoT endpoint 106 connects to the IoT management agent 163 over the LAN 109. This connection can occur in a number of scenarios. For example, the IoT management agent 163 can detect network traffic from the IoT endpoint 106. As another example, the IoT management agent 163 can receive a request from the IoT endpoint 106. One example of a request is an enrollment request from the IoT endpoint 106 to enroll or register with the IoT management service 116.

Then at step 406, the IoT management agent 163 can verify the identity of an IoT endpoint 106 communicating through the LAN 109 with the IoT management agent 163. For example, the IoT management agent 163 can verify the identity of the IoT endpoint 106 in response to the IoT endpoint 106 joining or being connected to the LAN 109. Similarly, the IoT management agent 163 can verify the identity of the IoT endpoint 106 in response to a request from the IoT endpoint 106 to enroll with the IoT management service 116.

Verification can be performed using various approaches. For example, the IoT endpoint 106 can use a preinstalled certificate to authenticate itself with the IoT management agent 163. Accordingly, the IoT management agent 163 can communicate with the certificate authority 123 to determine the validity of the certificate. If the certificate is valid, then the IoT endpoint 106 can be considered to be authenticated.

Later, at step 409, the IoT management agent 163 can send an enrollment request to the IoT management service 116 on behalf of the IoT endpoint 106. The enrollment request can include a device identifier 146 and potentially other information, such as one or more device properties of the IoT endpoint 106.

Next, at step 411, the IoT management service 116 enrolls or registers an IoT endpoint 106 in response to an enrollment or registration request received from the IoT management agent 163. For example, the IoT management service 116 can create a device record 129 for the IoT endpoint 106 that includes the device identifier 146 of the IoT endpoint 106. At this point, the IoT endpoint 106 can be considered to be enrolled with the IoT management service 116.

In some implementations, the IoT management service 116 can also verify the enrollment request for the IoT endpoint 106 that was received from the IoT management agent 163. For example, the IoT management service 116 can verify with the certificate authority 123 that the certificate used by the IoT management agent 163 or the IoT endpoint 106, as appropriate, to sign the enrollment request is a valid certificate. If the certificate and signatures are valid, then the IoT management service 116 can proceed to enroll the IoT endpoint 106.

Subsequently at step 413, the IoT management service 116 begins to collect or receive device metrics 153 from the enrolled IoT endpoint 106. In some instances, the device metrics 153 may be supplied automatically from the IoT endpoint 106 and relayed by the IoT management agent 163. In other instances, the IoT management service 116 can place a command in a command queue 143 associated with the IoT management agent 163 that instructs the IoT management agent 163 to begin providing device metrics 153 for the IoT endpoint 106.

Then, at step 415, the IoT management service 116 creates a device configuration 153 for the IoT Endpoint 106. For example, the IoT management service 116 can invoke a configuration function 136 to generate a device configuration 149. The configuration function 136 may accept one or more device metrics 153 as arguments. However, in some implementations, the device identifier 146 of a device record 129 may be provided to the configuration function 136. In response, the configuration function 136 can then retrieve the device metrics 153 stored in the device record 129. The device metrics 153 are analyzed and processed by the configuration function 136 to generate an optimal or preferred device configuration 149 for the IoT endpoint 106.

In some instances, the type of device configuration 149 may also be indicated when the configuration function 136 is invoked. For example, an IoT endpoint 106 may use a different device configuration 149 to operate in the most power-efficient manner than the device configuration 149 used to operate in a highest-performing manner. If the IoT management service 116 provides an argument specifying the type of device configuration 149 to be generated, the configuration function 136 may further base the device configuration 149 on the type of device configuration identified when the configuration function 136 is invoked.

Proceeding to step 417, the IoT management service 116 can then create a device campaign 133 to enforce the use of the previously generated device configuration 153. For instance, the IoT management service 116 can create a compliance policy 139 to enforce the use of the newly generated device configuration 149. For example, the IoT management service 116 may create a new compliance policy 139 and specify in the compliance policy that the IoT endpoint 106 use the most recently generated device configuration 149. As another example, the IoT management service 116 can create a new compliance policy 139, or update an existing compliance policy 139, that specifies the version of the device configuration 149 to be used.

Then, the IoT management service 116 can create a device campaign 133 to enforce the use of the device configuration 149. To create the device campaign 133, the IoT management service 116 may add the policy identifier 159 for the compliance policy 139 created at step 213 to the list of policy identifiers 159 of compliance policies 139 assigned to the device campaign 133. In some instances, additional compliance policies 139 may also be assigned to the device campaign 133, and therefore additional policy identifiers 159 may also be included in a device campaign 133.

However, in some instances, a device campaign 133 with a single policy identifier 159 may be created to enforce the use of the device configuration 149 generated at step 213.

Finally, the IoT management service 116 can automatically assign or subscribe the IoT endpoint 106 to the device campaign 133. For example, the IoT management service 116 may add the device identifier 146 of the IoT endpoint 106 to the list of enrolled device identifiers 161 for the device campaign 133. As a result, the IoT endpoint 106 is enrolled in the device campaign 133, thereby allowing the compliance policy 139 for the device configuration 149 to be enforced. The IoT management service 116 can then create a command specifying the device identifier 146 of the IoT endpoint 106 and the policy identifiers 159 for each compliance policy 139 listed in the device campaign 133. The command can then be inserted into a command queue 143 associated with the IoT management agent 163 the registered or enrolled the IoT endpoint 106.

Accordingly, at step 419, the IoT management agent 163 can retrieve the applicable compliance policy 139 for the newly enrolled IoT endpoint 106. For example, the IoT management agent 163 can retrieve one or more commands from the command queue 143. One or more of these commands can specify a policy identifier 159 of a compliance policy 139 to be enforced on or applied to the newly enrolled IoT endpoint 106. In response, the IoT management agent 163 can retrieve the applicable compliance policies 139 identified by the policy identifiers 159 listed in the commands retrieved from the command queue 143.

Then at step 423, the IoT management agent 163 can cause the applicable compliance policies 139 to be enforced for the newly enrolled IoT endpoint 106. As an example, if the compliance policy 139 specifies that a specific device configuration 149 or version of a device configuration 149 be installed on the IoT endpoint 106, the IoT management agent 163 can invoke a function provided by an application programming interface (API) of the IoT endpoint 106 to cause the IoT endpoint 106 to download and install the device configuration 149. An argument to the function could be the network address or path for the device configuration 149 to be installed. As another example, the IoT management agent 163 could retrieve the device configuration 149 and provide it to the IoT endpoint 106 (such as an argument to a function provided by an API) for installation. If the compliance policy 139 specified a value for a configuration setting of the IoT endpoint 106, then the IoT management agent 163 could similarly invoke a function provided by an API of the IoT endpoint 106 to modify the setting to the value specified in the compliance policy 139. Once the compliance policy 139 has been enforced or applied to the IoT endpoint 106, the process can end.

Although the IoT management service 116, the IoT management agent 119, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
at least one computing device comprising a processor and a memory;
machine readable instructions stored in the memory that, when executed by the processor, cause the at least one computing device to at least:
receive, from an Internet of Things (IoT) management agent executed by a gateway device: at least one transmission comprising a device identifier for an IoT endpoint, and a plurality of metrics for the IoT endpoint, the plurality of metrics comprising:
- a resource usage metric that specifies memory, processor, and bandwidth usage of the IoT endpoint,
- an application execution metric that identifies an application that is executed by the IoT endpoint, an execution start time for the application, and an execution end time for the application,
- a sensor reading of the IoT endpoint, and
- a user input metric that specifies a user command that changed a setting of the IoT endpoint and a time the user command was inputted to the IoT endpoint;

identify an efficiency-maximizing configuration type;

invoke a function that generates configuration data for the IoT endpoint, wherein the resource usage metric, the application execution metric, the efficiency-maximizing configuration type, the sensor reading and the user input metric are supplied as arguments to the function to generate the configuration data for the IoT endpoint;

create a device campaign to apply the configuration data to a plurality of IoT devices comprising the IoT endpoint, the device campaign comprising a compliance policy to be applied to the IoT endpoint, wherein the compliance policy identifies the configuration data;

transmit, to the gateway device, the compliance policy to be applied to the IoT endpoint, wherein the compliance policy is stored by the IoT management agent to enforce the compliance policy on the IoT endpoint; and invoke, by the IoT management agent, an application programming interface (API) provided by the IoT endpoint, the API being invoked using an argument that specifies a network path for the configuration data, wherein invoking the API using the network path causes the IoT endpoint to download and install the configuration data from the network path.

2. The system of claim 1, wherein the application execution metric comprises at least one argument output from the application.

3. The system of claim 1, wherein the machine readable instructions, when executed by the processor, further cause the at least one computing device to at least:
insert, into a command queue for the IoT management agent, a command that specifies the device identifier of the IoT endpoint and a policy identifier of the compliance policy, wherein the compliance policy is transmitted to the gateway device in an instance in which the IoT management agent retrieves the compliance policy based on the policy identifier.

4. The system of claim 1, wherein the compliance policy further comprises at least one remedial action, wherein the IoT management agent performs the at least one remedial action in an instance in which the IoT endpoint violates the compliance policy.

5. The system of claim 1, wherein the configuration data comprises a software package to be installed on the IoT endpoint.

6. The system of claim 1, wherein the configuration data comprises a configuration file comprising a value for a least one setting for the IoT endpoint.

7. The system of claim 1, wherein the configuration data comprises an updated version of a firmware for the IoT endpoint.

8. A method, comprising:
receiving, from an Internet of Things (IoT) management agent executed by a gateway device: at least one transmission comprising a device identifier for an IoT endpoint, and a plurality of metrics for the IoT endpoint, the plurality of metrics comprising:
- a resource usage metric that specifies memory, processor, and bandwidth usage of the IoT endpoint,
- an application execution metric that identifies an application that is executed by the IoT endpoint, an execution start time for the application, and an execution end time for the application,
- a sensor reading of the IoT endpoint, and
- a user input metric that specifies a user command that changed a setting of the IoT endpoint and a time the user command was inputted to the IoT endpoint;

identifying an efficiency-maximizing configuration type;

invoking a function that generates configuration data for the IoT endpoint, wherein the resource usage metric, the application execution metric, the efficiency-maximizing configuration type, the sensor reading and the user input metric are supplied as arguments to the function to generate the configuration data for the IoT endpoint;

creating a device campaign to apply the configuration data to a plurality of IoT devices comprising the IoT endpoint, the device campaign comprising a compliance policy to be applied to the IoT endpoint, wherein the compliance policy identifies the configuration data;

transmitting, to the gateway device, the compliance policy to be applied to the IoT endpoint, wherein the compliance policy is stored by the IoT management agent to enforce the compliance policy on the IoT endpoint; and invoking, by the IoT management agent, an application programming interface (API) provided by the IoT endpoint, the API being invoked using an argument that specifies a network path for the configuration data, wherein invoking the API using the network path causes the IoT endpoint to download and install the configuration data from the network path.

9. The method of claim 8, wherein creating the device campaign further comprises:
creating the compliance policy to specify that the configuration data is to be applied; and
assigning the compliance policy to the device campaign.

10. The method of claim 8, further comprising:
receiving a command to invoke the function; and
invoking the function in response to receipt of the command.

11. The method of claim 8, wherein invoking the function that generates the configuration data for the IoT endpoint further comprises invoking the function at a periodic interval.

12. The method of claim 8, wherein the configuration data comprises a software package to be installed on the IoT endpoint.

13. The method of claim 8, wherein the configuration data comprises a configuration file comprising a value for a least one setting for the IoT endpoint.

14. The method of claim 8, wherein the configuration data comprises an updated version of a firmware for the IoT endpoint.

15. A non-transitory, computer-readable medium, comprising machine readable instructions that, when executed by a processor, cause a computing device to at least:
receive, from an Internet of Things (IoT) management agent executed by a gateway device: at least one transmission comprising a device identifier for an IoT endpoint, and a plurality of metrics for the IoT endpoint, the plurality of metrics comprising:
- a resource usage metric that specifies memory, processor, and bandwidth usage of the IoT endpoint,
- an application execution metric that identifies an application that is executed by the IoT endpoint, an execution start time for the application, and an execution end time for the application,
- a sensor reading of the IoT endpoint, and
- a user input metric that specifies a user command that changed a setting of the IoT endpoint and a time the user command was inputted to the IoT endpoint;

identify an efficiency-maximizing configuration type;
invoke a function that generates configuration data for the IoT endpoint, wherein the resource usage metric, the application execution metric, the efficiency-maximizing configuration type, the sensor reading and the user input metric are supplied as arguments to the function to generate the configuration data for the IoT endpoint;
create a device campaign to apply the configuration data to a plurality of IoT devices comprising the IoT endpoint, the device campaign comprising a compliance policy to be applied to the IoT endpoint, wherein the compliance policy identifies the configuration data;
transmit, to the gateway device, the compliance policy to be applied to the IoT endpoint, wherein the compliance policy is stored by the IoT management agent to enforce the compliance policy on the IoT endpoint; and
invoke, by the IoT management agent, an application programming interface (API) provided by the IoT endpoint, the API being invoked using an argument that specifies a network path for the configuration data, wherein invoking the API using the network path causes the IoT endpoint to download and install the configuration data from the network path.

16. The non-transitory, computer-readable medium of claim 15, wherein the machine readable instructions that cause the computing device to create the device campaign further cause the computing device to at least:
create the compliance policy to specify that the configuration data is to be applied; and
assign the compliance policy to the device campaign.

17. The non-transitory, computer-readable medium of claim 15, wherein the machine readable instructions, when executed by the processor, further cause the computing device to at least:
receive a command to invoke the function; and
invoke the function in response to receipt of the command.

18. The non-transitory, computer-readable medium of claim 15, wherein the machine readable instructions that cause the computing device to invoke the function that generates the configuration data for the IoT endpoint further cause the computing device to invoke the function at a periodic interval.

19. The non-transitory, computer-readable medium of claim 15, wherein the configuration data comprises a configuration file comprising a value for a least one setting for the IoT endpoint.

20. The non-transitory, computer-readable medium of claim 15, wherein a configuration type is selected from a plurality of configuration types comprising: a performance-maximizing configuration type, and the efficiency-maximizing configuration type.

* * * * *